United States Patent [19]
Ralea

[11] Patent Number: 6,003,640
[45] Date of Patent: Dec. 21, 1999

[54] ELECTRONIC BRAKING SYSTEM WITH BRAKE WEAR MEASUREMENT AND RUNNING CLEARANCE ADJUSTMENT

[75] Inventor: Mihai Ralea, Boonton Township, N.J.

[73] Assignee: The B.F. Goodrich Company, Brecksville, Ohio

[21] Appl. No.: 08/853,513

[22] Filed: May 9, 1997

[51] Int. Cl.$^6$ ................................................. F16D 55/36
[52] U.S. Cl. .................................. 188/71.5; 188/1.11 L; 188/162
[58] Field of Search .............................. 188/1.11 L, 71.5, 188/71.7, 71.8, 71.9, 196 V, 161, 162

[56] References Cited

U.S. PATENT DOCUMENTS

| | | |
|---|---|---|
| 4,381,049 | 4/1983 | Crossman . |
| 4,474,060 | 10/1984 | Crossman . |
| 4,503,946 | 3/1985 | Davidson et al. . |
| 4,542,809 | 9/1985 | Crossman ............................. 188/72.8 |
| 4,712,441 | 12/1987 | Abraham . |
| 4,865,162 | 9/1989 | Morris et al. . |
| 4,995,483 | 2/1991 | Moseley ................................ 188/162 |
| 5,339,069 | 8/1994 | Penner et al. . |
| 5,632,359 | 5/1997 | Camps et al. ................... 188/1.11 L X |

FOREIGN PATENT DOCUMENTS

| | | |
|---|---|---|
| 0526273A | 2/1993 | European Pat. Off. . |
| 0 643 290 | 3/1995 | European Pat. Off. . |
| 0 703 133 | 3/1996 | European Pat. Off. . |
| 30 32 558 | 3/1982 | Germany . |
| 34 44 301 | 6/1986 | Germany . |
| 195 19 948A | 12/1996 | Germany . |
| 195 36 695 | 4/1997 | Germany . |
| 95 00525 | 1/1993 | WIPO . |
| 95 33933 | 12/1995 | WIPO . |

OTHER PUBLICATIONS

Patent Abstract of Japan, vol. 15, No. 186 (M–1112), May 14, 1991, & JP 03 045462 A (Honda Motor).

*Primary Examiner*—Robert J. Oberleitner
*Assistant Examiner*—Pamela J. Lipka
*Attorney, Agent, or Firm*—Renner, Otto, Boisselle & Sklar, P.L.L.

[57] ABSTRACT

An electrically actuated aircraft brake system and method which provides for brake wear measurement and running clearance adjustment. Brake wear and running clearance measurement are obtained by analyzing the output of position sensing circuitry. In a preferred embodiment, present brake disk stack height is measured using actuator position sensors, and the output of the sensors is compared by a controller to a reference brake disk stack height to provide an indication of the amount of brake wear. The reference brake disk stack height is obtained by lightly loading the brake disk stack and using the actuator position sensor or sensors to measure the displacement of the actuator ram or rams to the brake disk stack. The controller also is operable to effect movement of the reciprocating ram for lightly loading the brake disk stack by a predetermined amount to obtain from the position transducer a present displacement value of the position signal, and then using the present displacement value to determine a running clearance position of the reciprocating ram by subtracting a predetermined clearance value from said present displacement value.

18 Claims, 8 Drawing Sheets

ND WITH
ELECTRONIC BRAKING SYSTEM WITH BRAKE WEAR MEASUREMENT AND RUNNING CLEARANCE ADJUSTMENT

FIELD OF THE INVENTION

The invention herein described relates generally to brake control systems, more particularly to electronic braking systems, and still more particularly to aircraft braking systems.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

As the brake disks wear, the running clearance of the actuator rams correspondingly increases. To maintain an acceptable running clearance, mechanical adjustor devices have been employed. While functional, these devices add weight and complexity to the braking system, and need to be overhauled usually each time the brake disk stack is replaced. For at least these reasons, it would be desirable to provide for running clearance adjustment without the need for these mechanical adjustor devices.

Present day aircraft brake systems also have employed wear pin indicators to measure overall wear of the brake disk stack. Brake wear is indicated by the length of the pin relative to a reference plate. This arrangement requires a visual inspection of the pin to determine wear and is inherently imprecise. It would be desirable to provide for brake wear measurement without the need for a visual inspection and with greater precision.

Moreover, it would be desirable to provide for brake actuator running clearance and brake wear indication utilizing means that may be interfaced into an electro-mechanical brake system. Electro-mechanical braking systems eliminate drawbacks associated with hydraulic braking systems such as fluid leaks, high maintenance requirements, fire hazard and higher overall weight.

SUMMARY OF THE INVENTION

The present invention provides a brake system and method, particularly an electrically actuated aircraft brake system and method, which provides for brake wear measurement while eliminating the need for previously used brake wear indicator pins. More particularly, brake wear measurement is obtained by analyzing the output of position sensing circuitry. In a preferred embodiment, present brake disk stack height is measured using an actuator position sensor or sensors, and the output of the sensor or sensors is compared to a reference brake disk stack height to provide an indication of the amount of brake wear. The reference brake disk stack height preferably is obtained by loading the brake disk stack by a predetermined amount and using the actuator position sensor or sensors to measure the displacement of the actuator ram or rams to the brake disk stack. In brake systems employing multiple actuator rams, the outputs of respective position sensors are averaged to provide an actuator displacement measurement for the associated brake disk stack. The actuator position sensor preferably is an absolute position encoder that outputs a signal representative of the actual position of the actuator ram relative to the brake housing.

Accordingly, a preferred embodiment of the invention provides a brake system and method characterized by a brake disk stack, at least one reciprocating ram, a motive device operatively connected to the reciprocating ram for selectively moving the reciprocating ram into and out of forceful engagement with the brake disk stack for applying and releasing braking force on a rotatable member (e.g., a wheel), and a controller that controls the motive device for selective control of the reciprocating ram and regulation of the force applied by the reciprocating ram against the brake disk stack. In accordance with the invention, a position sensor supplies a position signal representative of the position of the reciprocating ram, and the controller includes means for effecting displacement of the reciprocating ram to load the brake disk stack by a predetermined amount to obtain from the position sensor a present displacement value of the position signal, and for comparing said present displacement value to a reference displacement value to provide a measurement of wear of the brake disk stack.

A preferred embodiment of the invention is further characterized by the use of a position sensor directly linked to the actuator ram, and preferably one that is robust. A preferred position sensor is a LVDT transducer, although other types of transducers may be used, for example a potentiometer, an optical encoder, a RVDT transducer with a rotary input provided by suitable gearing, etc. As is preferred, the LVDT transducer is connected between the reciprocating ram and a brake housing to which the motive device is mounted. The motive device preferably is an electric servo motor, and the controller preferably includes a processor for controlling actuator position and application force. The processor preferably is programmed to perform the aforesaid brake wear measurement, and also a new brake disk stack measurement routine for obtaining a brake wear reference value for the new brake disk stack. The new brake disk stack measurement routine includes the steps of effecting displacement of the reciprocating ram to load the new brake disk stack by a predetermined amount to obtain from the position transducer a new brake disk stack displacement value of the position signal and then storing, preferably in non-volatile memory, said new brake disk stack displacement value as the reference displacement value against which subsequently obtained present displacement values are compared to provide a measurement of wear of the brake disk stack.

A preferred embodiment of brake system according to the invention further has provision for performing a running clearance adjustment routine. The controller is operable to effect movement of the reciprocating ram for loading the brake disk stack by a predetermined amount to obtain from the position transducer a present displacement value of the position signal, and then using said present displacement value to determine a running clearance position of the reciprocating ram. More particularly, provision is made for subtracting the predetermined clearance value from said present displacement value to obtain a new running clearance value, storing the new running clearance value in memory, and then using the new running clearance value in determining the running clearance position of the reciprocating ram.

As will be appreciated, an improved brake system arises from the use of either one or both of the above summarized wear measurement and running clearance features. In addition, these features are particularly useful in aircraft brake systems and particularly an electrically actuated aircraft brake system which does not need hydraulic components which are subject to various drawbacks including fluid leaks, high maintenance requirements, fire hazard, higher overall weight, etc.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Figure 1:
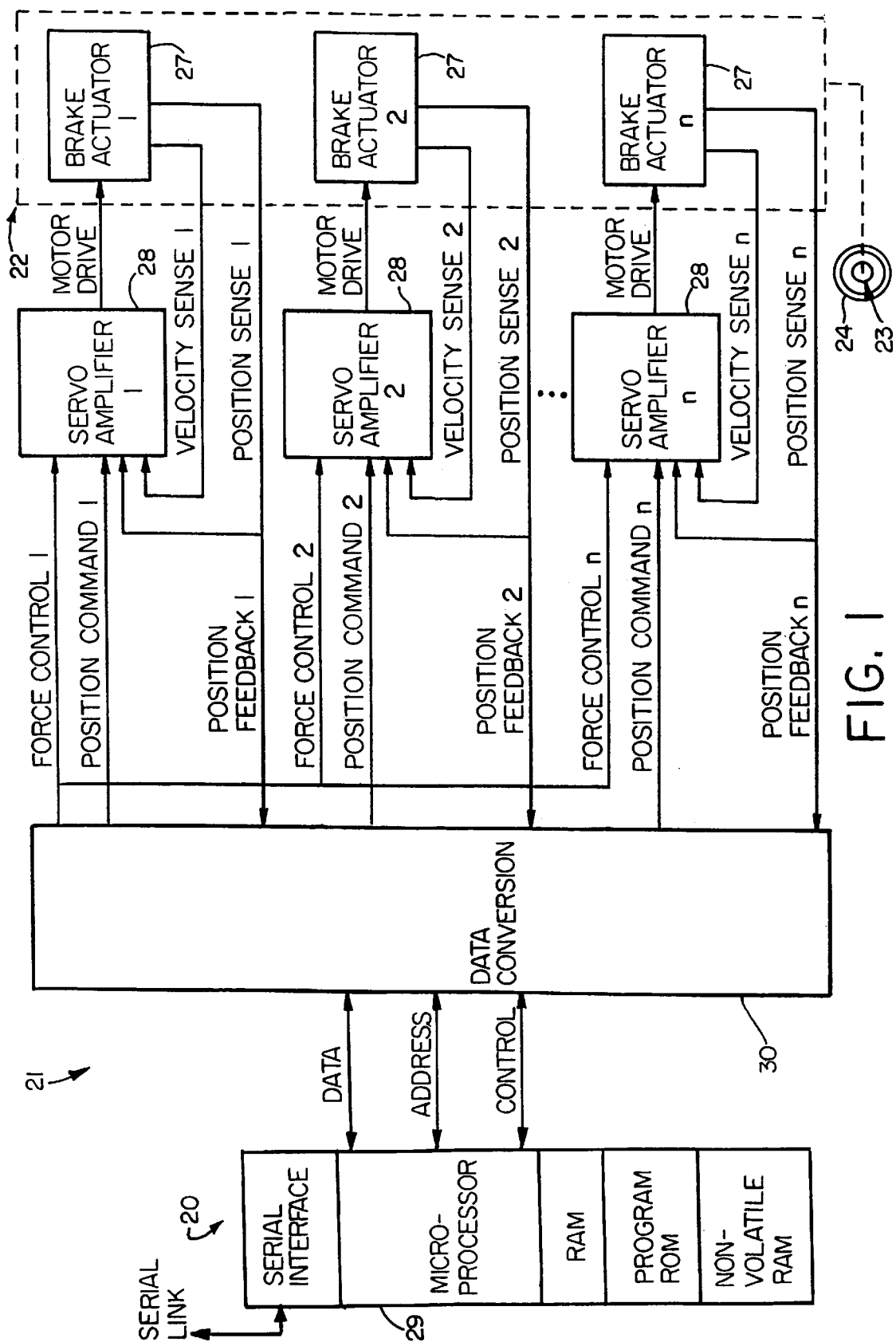
FIG. 1 is a diagrammatic illustration of an exemplary multi-actuator computer controlled brake actuation system.

Referring now in detail to the drawings, FIG. 1 diagrammatically illustrates an exemplary multi-actuator computer controlled brake actuation system 20 to which the principles of the invention may be applied. The major functions of the system 20 are performed by a controller 21 and a brake actuator assembly 22. The brake actuator assembly 22 may be mounted in a conventional manner on a wheel and brake assembly 23 to apply and release braking force on a rotatable wheel 24 of such wheel and brake assembly. The present invention is particularly suited for use in aircraft braking systems, as will be appreciated by those skilled in the art.

Because the invention was conceived and developed for use in an aircraft braking system and particularly in association with the system 20, it will be herein described chiefly in this context. However, the principles of the invention in their broader aspects can be adapted to other types of systems including, for example, hydraulic systems wherein hydraulic actuators are used and controlled either hydraulically or electrically. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

In the illustrated exemplary system 20, the brake actuator assembly 22 includes at least one and preferably a plurality of electro-mechanical actuators 27. The controller 21 includes a corresponding number of independent servo amplifiers 28, a micro-processor 29 with associated peripherals, and a data input/output (I/O) circuitry 30. As depicted, plural (for example, four) independent, linear electro-mechanical servo loops operate in a position mode, i.e., the linear position of each actuator is a function of an analog input voltage (or digital equivalent for a digital signal processor) applied to a position command input.

Figure 2:
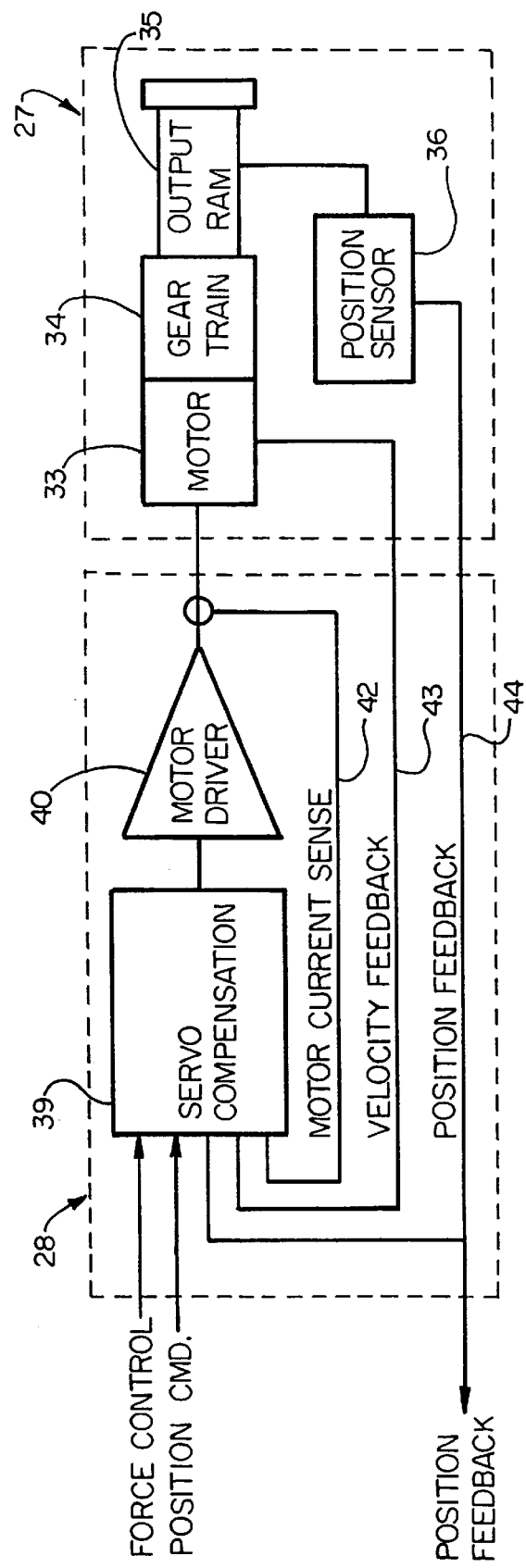
FIG. 2 is a diagrammatic illustration of a brake actuator and associated servo amplifier employed in the system of FIG. 1.

In FIG. 2, a representative electro-mechanical brake actuator 27 and associated servo amplifier 28 are illustrated in greater detail. The brake actuator 27 includes an electric servo motor 33, gear train 34, and a reciprocating output ram 35. The brake actuator has associated therewith an output ram position sensor 36 which provides for actuator position feedback as depicted. Although not shown, the brake actuator 27 also has associated therewith a motor tachometer to provide for velocity feedback.

The servo amplifier 28 includes servo loop compensation networks and amplifiers 39, and a DC motor driver 40 with associated control logic and current control circuitry. More particularly, the position servo amplifier 28 may include an inner motor current control servo loop 42, an intermediate motor velocity servo loop 43, and a ram position servo loop 44. Each loop may be compensated to obtain desired performance in terms of bandwidth, and to provide for uniform dynamic response of all brake actuators 27. In addition, the servo amplifier 28 includes means for controlling motor current and therefore the output force of the brake actuator in response to a force control input. The force control input may be an analog input signal that controls motor current level while the aforesaid position command input controls actuator displacement. As will be appreciated, the analog input signals may be replaced by digital input signals if a digital signal processor is used in the servo amplifier for actuator control.

As indicated, the displacement of each actuator 27 is controlled by the electronic controller 21 (FIG.1). The micro-processor 29 of the controller provides brake control algorithm processing, temporary data storage, in RAM, program memory storage, non-volatile data storage, and control of the servo amplifiers 28 via the input/output circuitry 30. The input/output circuitry 30 provides for digital-to-analog data conversion, generating the analog position commands and the analog motor current control commands to the four actuators, analog-to-digital data conversion to monitor the actuator position sense and motor current feedback signals, and signal discretes for auxiliary functions such as motor brake control. The micro-processor may also be interfaced via a serial communication link with other control components as needed, such as, for example, a anti-skid brake control unit. Although a micro-processor is utilized in the illustrated preferred embodiment, processing alternatively could be done analog as opposed to digital, or intermixed with digital processing as may be desired.

In the illustrated system, the four servo amplifiers 28 (FIG. 2) are independent and functionally identical, each amplifier being controlled by the micro-processor 29, responding to the position commands and motor current control signals from the processor, and feeding back the actuator position and motor current sense signals to the processor via the I/O circuitry 30.

The controller may use two separate power sources: for example, a 28 VDC supply to power the low level electronic circuitry and 28 to 270 VDC supply to power the four actuator motors through the motor driver power stage. The 28 VDC actuator power may be utilized in emergency situations when 270 VDC is not available to power system fault.

Figure 3:
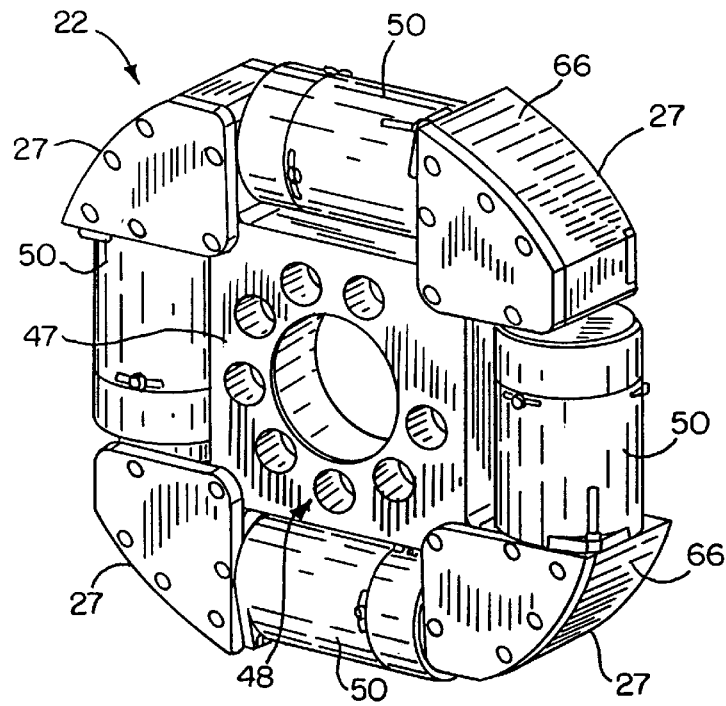
FIG. 3 is a perspective view of an exemplary brake housing and actuator assembly useful in the system of FIG. 1.
Figure 4:
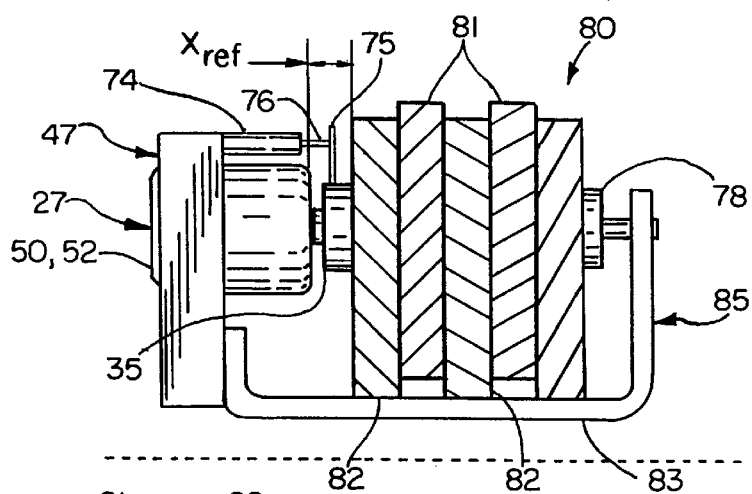
FIG. 4 is a schematic view showing a brake actuator assembly in relation to a new brake disk stack.
Figure 5:
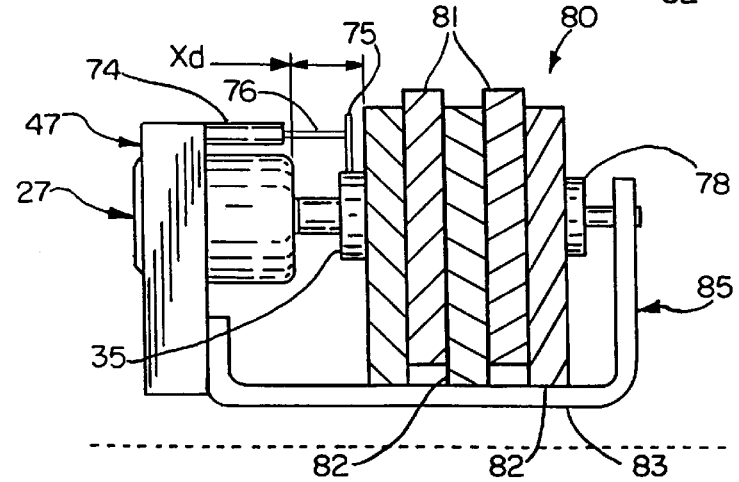
FIG. 5 is a schematic view showing the brake actuator in relation to a worn brake disk stack.

Further details of an exemplary brake actuator assembly 22 are shown in FIGS. 3–5. The brake actuator assembly includes a housing 47 that provides for the mounting of an electromechanical actuator 27, it being understood that typically multiple actuators will be mounted to the housing, such as four functionally identical actuators located at respective quadrants of the housing. The illustrated housing has a bolt circle 48 for mounting to the overall wheel and brake assembly 23 (FIG. 1). Each actuator 27 may include a DC brushless servo motor 50 and suitable reduction gearing 52 that translates rotary motor motion to linear motion of the ram 35 (the rams are hidden from view in FIG. 3). The brushless DC servo motor 50 may contain an integral friction type, fail-safe (power-off engaged) brake, and a resolver for motor rotor commutation and angular velocity sensing. The resolver provides motor position feedback and velocity information. In particular, the resolver provides an electrical signal that is proportional to motor shaft position.

The ram 35 of each actuator is mechanically connected to an LVDT position sensor 74, such as by bracket 75. The LVDT armature 76 may be adjustably attached to the bracket (or the sensor body to the brake housing) by suitable means that provides for LVDT setting and position calibration. A cover (not shown), or the like, may be provided to protect for the LVDT mounting mechanism. Although an LVDT sensor is preferred, other types of position sensors/transducers may be used as desired for a particular application.

The purpose of the brake actuator(s) 27 is to impress a clamping force on the stack 80 of brake disk elements. The electromechanical (EM) actuator(s) operate simultaneously to produce a clamping force between a brake reaction plate 78 and the actuator output rams 35. An exemplary system utilizes four actuators, operating simultaneously, to provide the total brake clamping force required. However, the size and number of actuators may be varied to provide the total brake clamping force required. The actuators may be operated in a controlled displacement mode such that the clamping force is proportional to the deflection of the reaction plate. Although each actuator can operate independently, the actuators may be commanded in pairs (or otherwise), the actuators of each pair being located physically on diametrically opposite sides on the brake housing.

The brake disk stack 80 includes alternating rotor disks 81 and stator disks 82 mounted with respect to a torque tube 83 or similar member and the wheel (not shown) for relative axial movement. Each rotor disk 81 is coupled to the wheel for rotation therewith and each stator disk 82 is coupled to the torque tube 83 against rotation. A back plate 85 is located at the rear end of the brake disk stack and functions as a force reaction member via the reaction plate 78. The brake actuator 27 is mounted to brake housing 47 fixed with respect to the torque tube. The ram 35 of the actuator extends to compress the brake disk stack 80 against the back plate 85, and torque is taken out by the stator disks 82 through the static torque tube 83 (or the like).

Figure 6:
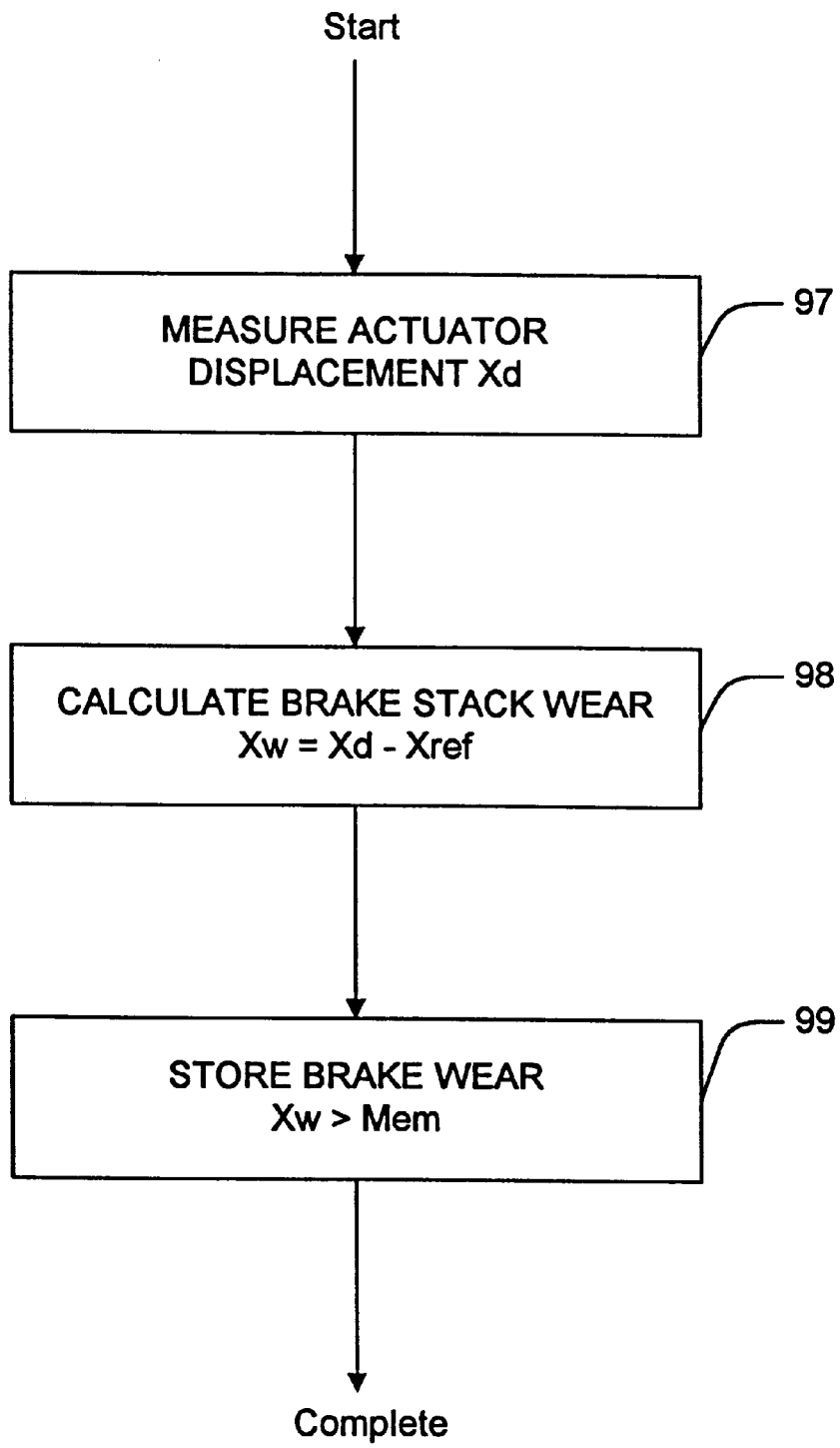
FIG. 6 is a flowchart illustrating a method for measuring brake disk stack wear.

As the brake disks wear, the collective axial thickness thereof will decrease. In accordance with the invention, the controller 21 (FIG. 1) is suitably programmed to carry out a wear measurement routine which is illustrated by the flow chart shown in FIG. 6 and a running clearance adjustment routine which is illustrated by the flow chart shown in FIG. 9. The wear measurement routine preferably uses a reference value corresponding to zero wear, such value corresponding to the thickness of a new brake disk stack. The new brake stack reference value is determined by the controller in accordance with a routine illustrated by the flow chart shown in FIG. 7. Both the wear measurement routine and the new brake disk stack reference measurement routine preferably use a further routine for measuring actuator displacement, this routine being illustrated by the flow chart shown in FIG. 8.

Figure 8:
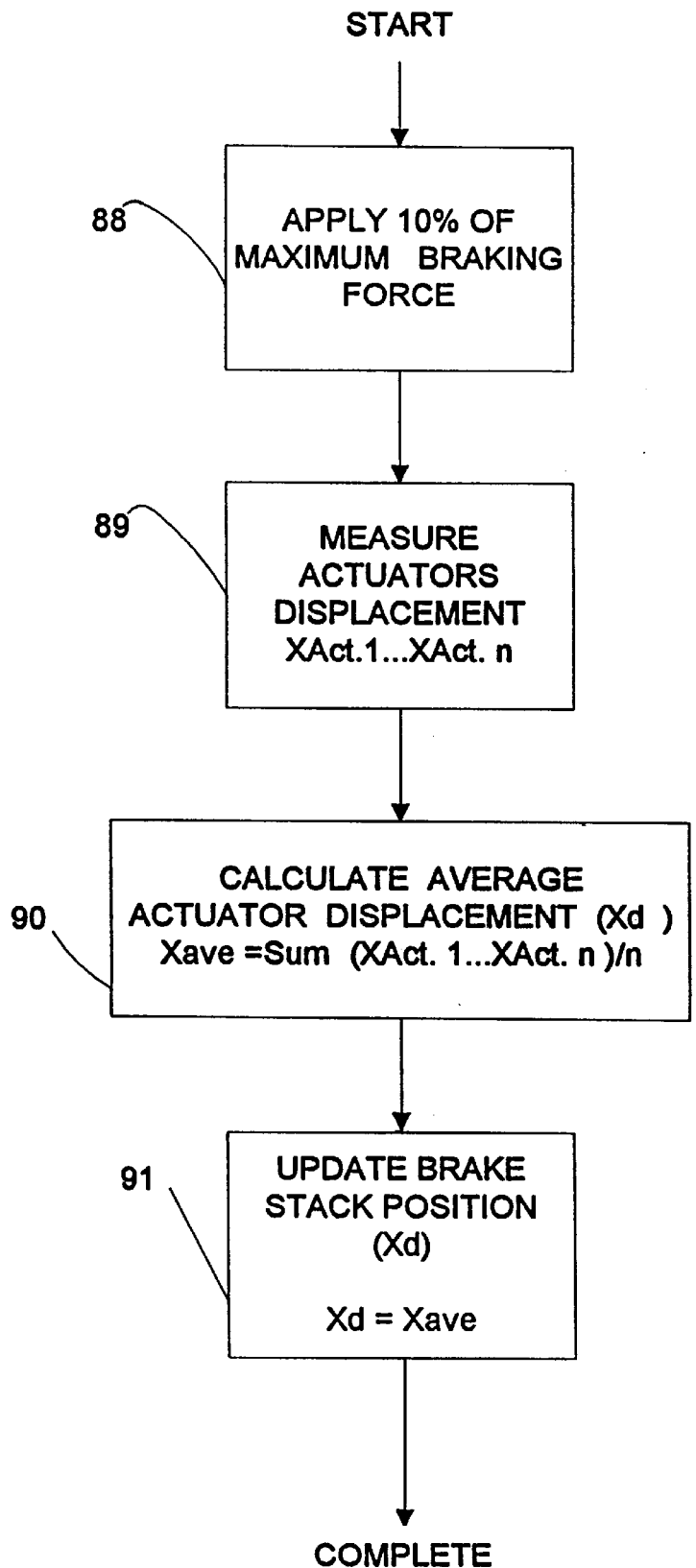
FIG. 8 is a flowchart illustrating a method for measuring brake actuator displacement.

In FIG. 8, actuator displacement measurement begins at step 88 where the actuator rams (or ram in a single actuator system) are extended by the controller to load the brake disk stack by a predetermined amount. The amount of loading need only be enough to ensure that the individual disks of the brake disk stack are held against one another to remove any slack in the stack. For this purpose, the actuator rams preferably apply about 10% of maximum braking force to the brake disk stack. At step 89, the displacement (travel) X of each actuator ram is measured using the respective position sensor 74 (FIGS. 4 and 5). Then, preferably, an average actuator ram displacement is calculated at step 90, and at step 91 the average actuator ram displacement Xave is used to establish the actuator displacement value Xd. More particularly, in the illustrated preferred embodiment where the controller operates the actuators in pairs (each pair including diametrically opposite actuators), the actuator ram displacement of the actuators of each pair is measured and used to calculate an average actuator displacement value for that pair of actuators. Thus average actuator displacements are calculated for each set of paired actuators. This is done because positions of the rams may vary for the same input, as when one actuator pushes harder than the other actuator with which it is paired.

Figure 7:
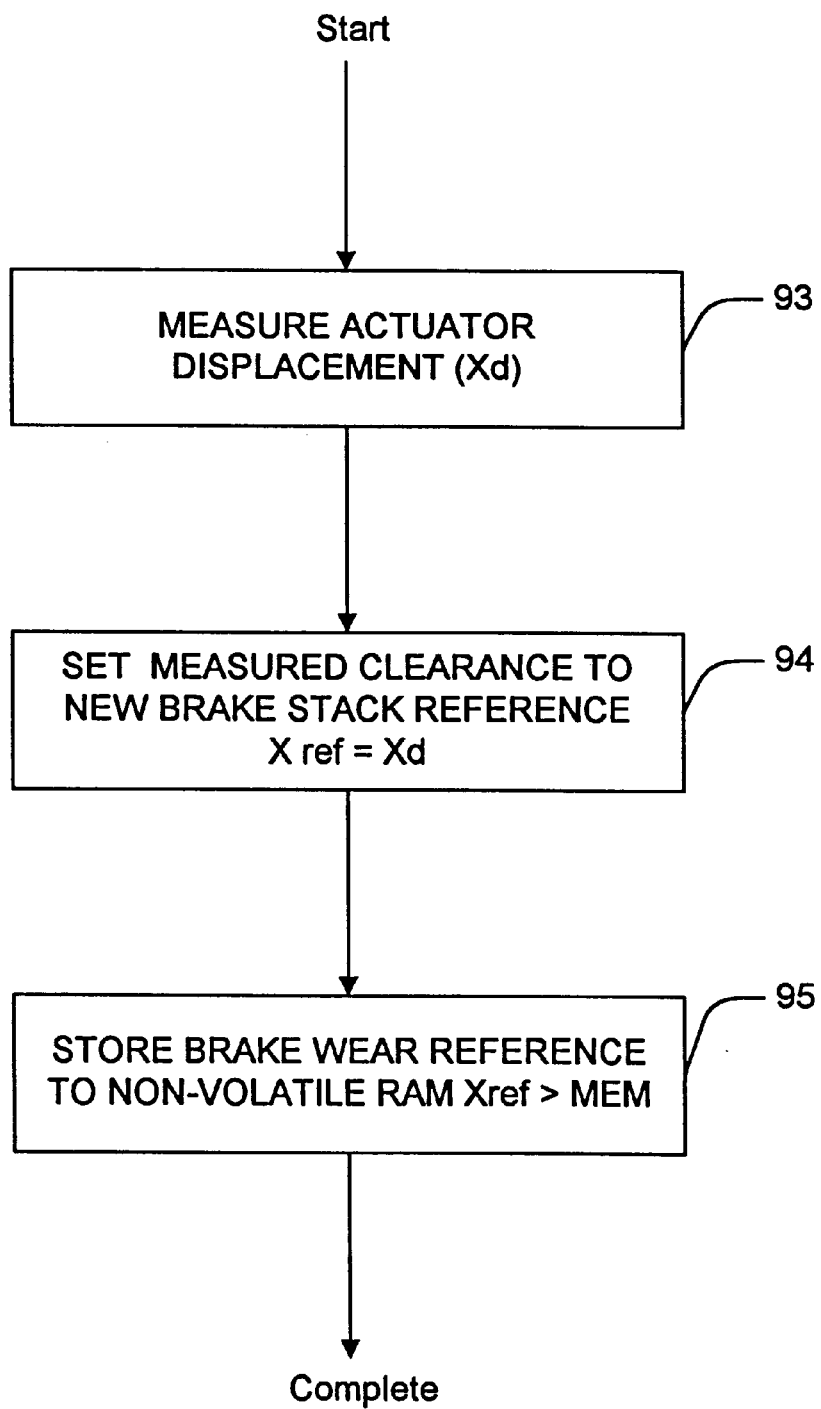
FIG. 7 is a flowchart illustrating a method for obtaining a new brake disk stack reference value.

In FIG. 7, the new brake disk stack reference measurement routine begins at step 93 where the actuator displacement measurement routine of FIG. 8 is used to return an actuator ram displacement measurement Xd for a new brake disk stack. At step 94, the new brake disk stack reference measurement value Xref (see FIG. 4) is then set by the controller to the measured clearance Xd. At step 95, the new brake disk stack reference value is then stored, preferably in non-volatile memory, for use by the brake wear measurement routine.

Returning now to FIG. 6, brake wear measurement begins at step 97 where the actuator displacement measurement routine of FIG. 8 is used to return an actuator ram displacement measurement Xd for the brake disk stack which has undergone wear as depicted in FIG. 5. Then, at step 98, brake disk stack wear Xw is calculated by subtracting the brake disk stack reference measurement value Xref from the measured ram displacement Xd. The brake disk stack wear Xw then may be stored at step 99 in memory. The brake disk stack wear Xw may also be used by the controller to provide a warning signal if the brake disk stack wear satisfies a predetermined criteria. For example, if the brake disk stack has worn to a predetermined percentage of its original thickness, then a signal may be given to indicate that the brake disk stack requires replacement.

Figure 9:
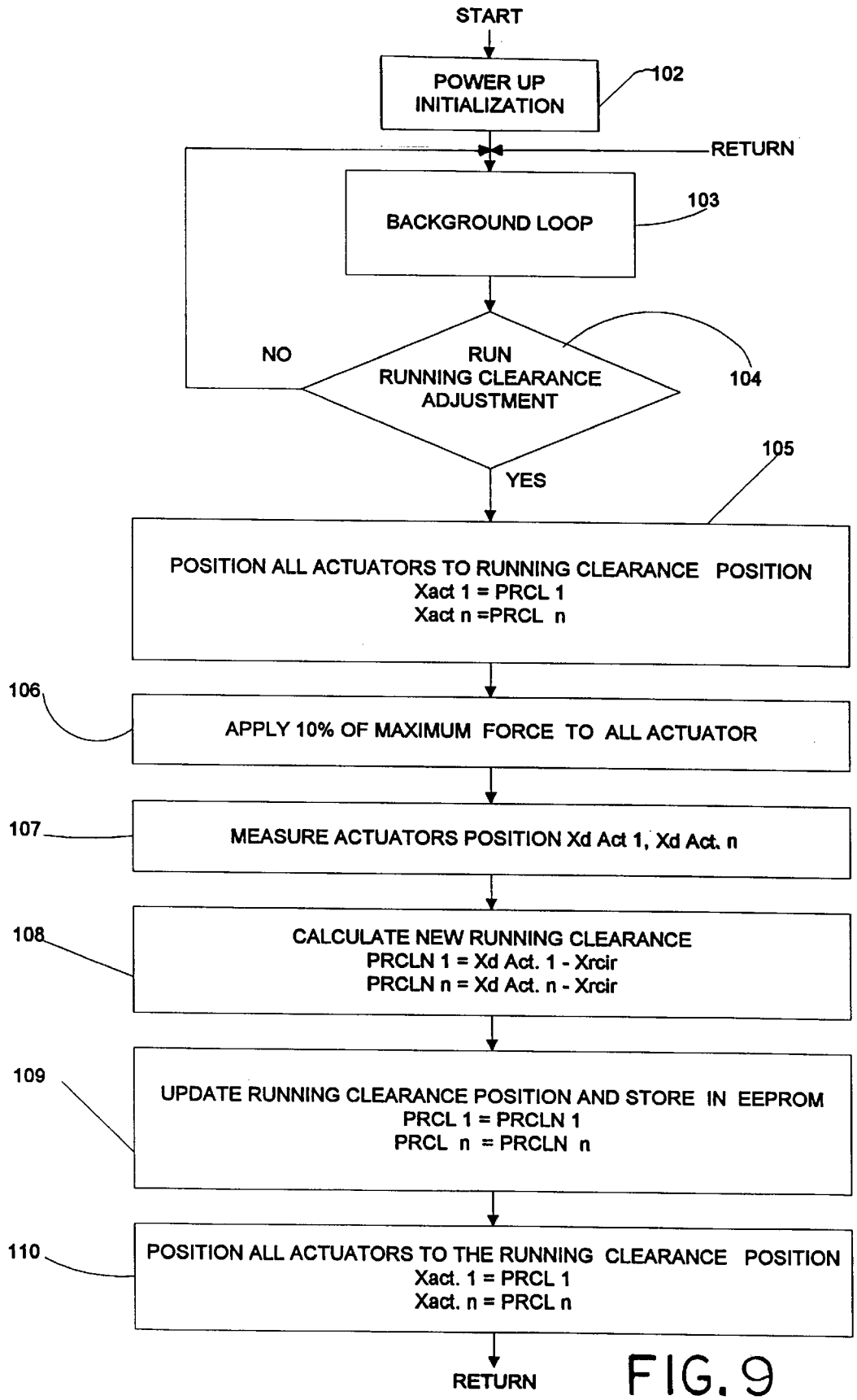
FIG. 9 is a flowchart illustrating a method for effecting running clearance adjustment.
Figure 10:
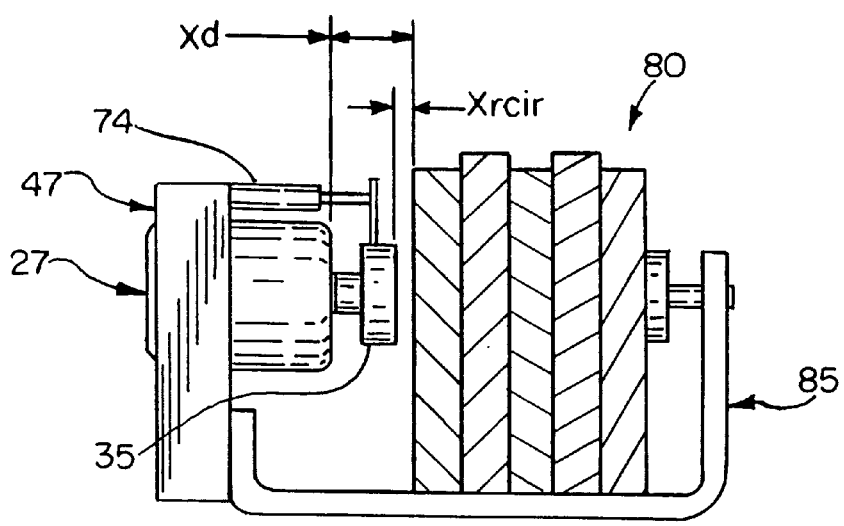
FIG. 10 is a schematic view showing the running clearance in relation to actuator ram displacement.

Referring now to FIG. 9, the running clearance adjustment routine begins upon the system being powered up initially at step 102. After initialization, operation proceeds to a background loop at step 103. The background loop includes as one of its procedures (other procedures may include, for example, health monitoring procedures and command confirmation procedures) a step 104 where the controller checks to see if a running clearance adjustment should be made. In the illustrated system, this is determined by the brake control system which may send an enable command at an appropriate time for running clearance adjustment, as when the landing gear is extended before landing, or when the plane is on the ground. If the prescribed criteria is not satisfied, the controller returns to the background loop 103. If the prescribed criteria is satisfied, the controller proceeds to step 105 at which all actuators are positioned at the then active running clearance position. Then, at step 106, the actuator rams (or ram in a single actuator system) are extended to load the brake disk stack by a predetermined amount. As before, the amount of loading need only be enough to ensure that the individual disks of the brake disk stack are held against one another, again to remove any slack from the stack. For this purpose, the actuator rams preferably apply 10% of maximum braking force to the brake disk stack. At step 107, the displacement Xd (travel) of each actuator ram (or average displacement of paired actuators) is measured using the respective position sensor 74 (FIGS. 4 and 5). Then, at step 108, a new running clearance PRCLN is calculated for each actuator (or actuator pair) by subtracting a fixed displacement Xrclr from the measured ram displacement Xd (or average displacement). At step 109, the new running clearance value PRCLN is set as the active running clearance PRCL which is stored, preferably in non-volatile memory. Finally, at step 110, the controller positions each actuator at the active running clearance position, after which the controller returns to the background loop.

It is noted that although the position sensor is used to provide information on the position of the ram, the resolver could be used to provide the running clearance adjustment. That is, the controller can use the output of the resolver to determine the running clearance position of the rams. However, preferably an absolute position encoder is used.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A brake system comprising:

a brake disk stack;

a reciprocating ram;

a servo motor operatively connected to the reciprocating ram for selectively moving the reciprocating ram into and out of forceful engagement with the brake disk stack for applying and releasing braking force on a rotatable wheel;

a controller for controlling the servo motor for selective control of the reciprocating ram and regulation of the force applied by the reciprocating ram against the brake disk stack, and a position sensor which supplies a position signal representative of the position of the reciprocating ram; and wherein the controller includes means for effecting displacement of the reciprocating ram to load the brake disk stack by a predetermined amount to obtain from the position sensor a present displacement value of the position signal, and for comparing said present displacement value to a reference value to provide a measurement of wear of the brake disk stack.

2. A brake system as set forth in claim 1, wherein the position sensor includes a LVDT transducer.

3. A brake system as set forth in claim 2, comprising a brake housing to which said servo motor is mounted, and said LVDT transducer is connected between said reciprocating ram and brake housing.

4. A brake system as set forth in claim 1, wherein said controller includes a processor for controlling the position of the actuator ram and the force applied by the ram against the brake disk stack.

5. A brake system as set forth in claim 1, wherein the controller includes means for performing a running clearance adjustment routine including the steps of effecting movement of the reciprocating ram for loading the brake disk stack by a predetermined amount to obtain from the position sensor a present displacement value of the position signal, and then using said present displacement value to determine a running clearance position of the reciprocating ram.

6. A brake system as set forth in claim 5, wherein said using step of said running clearance adjustment routine includes the steps of subtracting a predetermined clearance value from said present displacement value to obtain a new running clearance value, storing the new running clearance value in memory, and then using the new running clearance value in determining the running clearance position of the reciprocating rams.

7. A brake system comprising:

a brake disk stack;

a reciprocating ram;

a motive device operatively connected to the reciprocating ram for selectively moving the reciprocating ram into and out of forceful engagement with the brake disk stack for applying and releasing braking force on a rotatable wheel;

a controller for controlling the motive device for selective control of the reciprocating ram and regulation of the force applied by the reciprocating ram against the brake disk stack, and a position sensor which supplies a position signal representative of the position of the reciprocating ram; and wherein the controller includes means for effecting displacement of the reciprocating ram to load the brake disk stack by a predetermined amount to obtain from the position sensor a present displacement value of the position signal, and for comparing said present displacement value to a reference value to provide a measurement of wear of the brake disk stack; and wherein the controller includes means for performing a new brake disk stack measurement routine including the steps of effecting displacement of the reciprocating ram to load the new brake disk stack by a predetermined amount to obtain from the position sensor a new brake disk stack displacement value of the position signal and then storing said new brake disk stack displacement value as the reference value against which subsequently obtained present displacement values are compared to provide a measurement of wear of the brake disk stack.

8. A brake system as set forth in claim 7, wherein said reference value is stored in a non-volatile memory.

9. In combination with an aircraft wheel assembly, a brake system comprising:
   a brake disk stack;
   a reciprocating ram;
   a motive device operatively connected to the reciprocating ram for selectively moving the reciprocating ram into and out of forceful engagement with the brake disk stack for applying and releasing braking force on a rotatable wheel;
   a controller for controlling the motive device for selective control of the reciprocating ram and regulation of the force applied by the reciprocating ram against the brake disk stack, and
   a position sensor which supplies a position signal representative of the position of the reciprocating ram; and
   wherein the controller includes means for effecting displacement of the reciprocating ram to load the brake disk stack by a predetermined amount to obtain from the position sensor a present displacement value of the position signal, and for comparing said present displacement value to a reference value to provide a measurement of wear of the brake disk stack.

10. A method for measuring wear of a brake disk stack in a brake system, the brake system including a servo motor operatively connected to a reciprocating ram for selectively moving the reciprocating ram into and out of forceful engagement with the brake disk stack for applying and releasing braking force on a rotatable member, and a controller for controlling the servo motor for selective control of the reciprocating ram and regulation of the force applied by the reciprocating ram against the brake disk stack, said method comprising the steps of:
   using a position sensor to supply a position signal representative of the position of the reciprocating ram;
   effecting displacement of the reciprocating ram to load the brake disk stack by a predetermined amount to obtain from the position sensor a present displacement value of the position signal; and
   then comparing said present displacement value to a reference value to provide a measurement of wear of the brake disk stack.

11. A method as set forth in claim 10, comprising the step of providing a warning signal when the measured wear satisfies a predetermined criteria.

12. A method as set forth in claim 10, wherein the step of using a position sensor includes using a LVDT transducer.

13. A method as set forth in claim 10, comprising the steps of effecting movement of the reciprocating ram for loading the brake disk stack by a predetermined amount to obtain from the position sensor a present displacement value of the position signal, and then using said present displacement value to determine a running clearance position of the reciprocating ram.

14. A method as set forth in claim 13, wherein said using step includes the steps of subtracting a predetermined clearance value from said present displacement value to obtain a new running clearance value, storing the new running clearance value in memory, and then using the new running clearance value in determining the running clearance position of the reciprocating rams.

15. A method for measuring wear of a brake disk stack in a brake system, the brake system including a motive device operatively connected to a reciprocating ram for selectively moving the reciprocating ram into and out of forceful engagement with the brake disk stack for applying and releasing braking force on a rotatable member, and a controller for controlling the motive device for selective control of the reciprocating ram and regulation of the force applied by the reciprocating ram against the brake disk stack, said method comprising the steps of:
   using a position sensor to supply a position signal representative of the position of the reciprocating ram;
   effecting displacement of the reciprocating ram to load the brake disk stack by a predetermined amount to obtain from the position sensor a present displacement value of the position signal; and
   then comparing said present displacement value to a reference value to provide a measurement of wear of the brake disk stack; and
   said method further comprising the steps of:
      effecting displacement of the reciprocating ram to load the new brake disk stack by a predetermined amount to obtain from the position sensor a new brake stack displacement value of the position signal, and
      then storing said new brake disk stack displacement value as the reference value against which subsequently obtained present displacement values are compared to provide a measurement of wear of the brake disk stack.

16. A method as set forth in claim 15, wherein said reference value is stored in a non-volatile memory.

17. A wheel and brake system comprising:
   a rotatable wheel;
   a brake disk stack operatively connected to said wheel for applying and releasing braking force on the rotatable wheel;
   a reciprocating ram;
   a servo motor operatively connected to the reciprocating ram for selectively moving the reciprocating ram into and out of forceful engagement with the brake disk stack for applying and releasing braking force on the rotatable wheel;
   a controller for controlling the servo motor for selective control of the reciprocating ram and regulation of the force applied by the reciprocating ram against the brake disk stack, and
   a position sensor which supplies a position signal representative of the position of the reciprocating ram; and
   wherein the controller includes means for effecting displacement of the reciprocating ram to load the brake disk stack by a predetermined amount to obtain from the position sensor a present displacement value of the position signal, and for comparing said present displacement value to a reference value to provide a measurement of wear of the brake disk stack.

18. A wheel and brake system as set forth in claim 17, wherein the controller includes means for performing a running clearance adjustment routine including the steps of effecting movement of the reciprocating ram for loading the brake disk stack by a predetermined amount to obtain from the position sensor a present displacement value of the position signal, and then using said present displacement value to determine a running clearance position of the reciprocating ram.

* * * * *